(12) United States Patent
Mügge

(10) Patent No.: US 10,113,706 B2
(45) Date of Patent: Oct. 30, 2018

(54) LASER LIGHTING DEVICE

(71) Applicant: Hella KGaA Hueck & Co., Lippstadt (DE)

(72) Inventor: Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 62 days.

(21) Appl. No.: 14/908,224

(22) PCT Filed: Aug. 13, 2014

(86) PCT No.: PCT/EP2014/067326
§ 371 (c)(1),
(2) Date: Jan. 28, 2016

(87) PCT Pub. No.: WO2015/043819
PCT Pub. Date: Apr. 2, 2015

(65) Prior Publication Data
US 2016/0208996 A1    Jul. 21, 2016

(30) Foreign Application Priority Data
Sep. 19, 2013    (DE) ......................... 10 2013 110 344

(51) Int. Cl.
| F21V 13/04 | (2006.01) |
| G02B 27/18 | (2006.01) |
| F21S 8/10 | (2006.01) |
| B60Q 1/26 | (2006.01) |
| F21S 43/19 | (2018.01) |
| F21S 43/13 | (2018.01) |
| F21S 43/14 | (2018.01) |
| F21S 43/27 | (2018.01) |
(Continued)

(52) U.S. Cl.
CPC .......... F21S 48/232 (2013.01); B60Q 1/2607 (2013.01); F21S 41/16 (2018.01); F21S 43/13 (2018.01); F21S 43/14 (2018.01); F21S 43/19 (2018.01); F21S 43/26 (2018.01); F21S 43/27 (2018.01); F21S 43/37 (2018.01); F21S 43/40 (2018.01); F21S 43/50 (2018.01)

(58) Field of Classification Search
CPC .......... F21V 13/04; F21V 13/12; F21V 13/14; F21Y 2115/30; G02B 27/18; G02B 27/20
See application file for complete search history.

(56) References Cited

U.S. PATENT DOCUMENTS 3,407,294 A * 10/1968 Hill ...................... G02B 5/0278
                                                                    352/198
3,754,814 A *  8/1973 Leith ....................... G03H 1/32
                                                                    359/559
(Continued)

FOREIGN PATENT DOCUMENTS

CN         1313515 A      9/2001
CN       201246652 Y      5/2009
(Continued)

*Primary Examiner* — Ismael Negron
(74) *Attorney, Agent, or Firm* — Husch Blackwell LLP

(57) ABSTRACT

A lighting device with a laser light source, a deflecting reflector positioned at an angle to the laser light source, and a lens for focusing light from the laser light source to the deflecting reflector. In another embodiment, the lighting device includes only the laser light source and a lens arranged in the main radiation direction in front of the laser light source.

11 Claims, 5 Drawing Sheets

(51) Int. Cl.
*F21S 43/20* (2018.01)
*F21S 43/37* (2018.01)
*F21S 43/40* (2018.01)
*F21S 43/50* (2018.01)
*F21S 41/16* (2018.01)

(56) References Cited

U.S. PATENT DOCUMENTS

| | | | | |
|---|---|---|---|---|
| 4,109,304 | A * | 8/1978 | Khvalovsky | F21V 5/00 359/627 |
| 6,040,787 | A | 3/2000 | Durham | |
| 6,350,041 | B1 * | 2/2002 | Tarsa | F21V 7/0091 257/E33.072 |
| 8,702,286 | B2 * | 4/2014 | Nakazato | F21S 48/1145 362/510 |
| 9,103,517 | B2 * | 8/2015 | Nakazato | F21S 48/1145 |
| 9,228,725 | B2 * | 1/2016 | Ito | A61B 1/07 |
| 9,562,661 | B2 * | 2/2017 | Kijima | F21S 48/1159 |
| 2006/0039160 | A1 * | 2/2006 | Cassarly | A47F 11/10 362/551 |
| 2007/0097703 | A1 * | 5/2007 | Goldfain | F21L 4/02 362/572 |
| 2011/0249460 | A1 | 10/2011 | Kushimoto | |
| 2012/0106186 | A1 * | 5/2012 | Kishimoto | C09K 11/0883 362/510 |
| 2013/0033859 | A1 * | 2/2013 | Yaphe | F21V 5/007 362/223 |
| 2016/0091783 | A1 * | 3/2016 | Hu | G03B 21/14 362/553 |

FOREIGN PATENT DOCUMENTS

| | | |
|---|---|---|
| CN | 102734730 A | 10/2012 |
| DE | 102004025153 A1 | 12/2004 |
| DE | 102006057731 A1 | 6/2007 |
| DE | 102007002689 A1 | 9/2007 |
| DE | 102008009820 A1 | 9/2008 |
| DE | 102007040202 A1 | 2/2009 |
| DE | 102011119859 A1 | 6/2012 |
| EP | 1411291 A2 | 4/2004 |
| EP | 2143991 A2 | 1/2010 |
| WO | 0238413 A1 | 5/2002 |
| WO | 2006027621 A2 | 3/2006 |
| WO | 2005055328 A1 | 6/2007 |
| WO | 2009040725 A2 | 4/2009 |

* cited by examiner

LASER LIGHTING DEVICE

CROSS REFERENCE

This application claims priority to PCT Patent Application No. PCT/EP2014/067326, filed 13 Aug. 2014, which itself claims priority to German Application No. 10 2013 110 344.8, filed 19 Aug. 2013, the entirety of both of which are hereby incorporated by reference.

FIELD OF THE INVENTION

The invention relates to a lighting device for vehicles with a laser light source and an upstream light conducting device for generating a predetermined light function, characterized in that the light conducting device comprises a reflector which serves as a deflecting reflector for the laser light source, wherein the laser light source is aligned twisted about a horizontal and/or vertical plane and is positioned beside, above or below the reflector so that the light emitted from the laser light source is radiated toward the reflector and deflected by it in the main radiation direction to generate the predetermined light function, wherein a lens is provided for focusing the light emitted from the laser light source in the direction of the deflecting reflectors, or that the light conducting device comprises only a lens for generating the light distribution of a light function in the main radiation direction, wherein the lens is placed in the main radiation direction before the laser light source.

BACKGROUND OF THE INVENTION

WO 2009/040725 A2 discloses a lighting device for vehicles having a laser light source for generating a light beam. In order to create an incoherent light source that emits a relatively homogeneous beam of light, the well-known lighting device provides a light conducting device for the conversion of the light beam emitted by the laser light source into a light bundle. The light conducting device comprises a cylindrical transparent fiber material, on whose end faces are arranged mirrors. On the circumference, the fiber material is provided with a coating with scattering effect. A disadvantage of the known lighting device is that it has a relatively large volume.

Heretofore, incandescent lamps, halogen lamps, or LED light sources have been mostly used in vehicles for the functions of a signal light. LED light sources have a relatively small dimension, which can produce different lighting functions with appropriate light conducting devices such as fiber optics or reflectors. To generate a rear fog light function, usually multiple LED light sources are used, because the control effort would be too great when using a single LED light source due to the luminous flux variations. In this respect, the dimension of the lighting device with the use of LED light sources can be reduced in many cases only to a certain extent. A reduction of the dimension of the lighting device has limits to the extent as for a rear fog light function a minimum distance to a stoplight function must be always maintained. Against this background that for designing reasons the lights must increasingly have a smaller dimension, the integration of a rear fog light in a housing of a lighting device, which is to radiate more light functions, becomes more and more difficult.

SUMMARY OF THE INVENTION

The object of the invention is therefore to further develop a lighting device for vehicles in such a manner that the space requirement for a light function, in particular a rear fog light function can be further reduced so as to create a greater variability in the design of the lighting device.

To achieve the object, the lighting device is characterized in that the light emitted from the laser light source is radiated in the direction of the reflector and deflected by it in the main radiation direction to generate the predetermined light function, wherein a lens is provided for focusing the light from the laser light source in the direction of the deflecting reflectors, or in that the light conducting device consists of only one lens to produce the light distribution of a lighting function in the main radiation direction, wherein the lens in the main radiation direction is disposed in front of the laser light source.

The particular advantage of the invention is that a compact and a small-sized lighting function with a relatively small light-emitting surface can be formed, which is positioned in a lighting device in a space-saving fashion. This compact light function has an efficient light distribution and high intensities. In particular, this allows creating a space-saving rear fog light.

According to a preferred embodiment, a space-saving arrangement of several light functions is created, wherein light conducting devices of the different lighting functions are arranged in the main radiation direction of the lighting device. The light conducting devices of a first lighting function is configured as a light guide, which at its edge and/or on its front flat side emits light for generating the first light function. As a light conducting device of the second light function, a reflector is provided which is arranged in the main radiation direction of the light guide of the first light function so that light from a laser light source can be emitted while passing through the light guide of the first light function for generating the second light function. The laser light source is advantageously covered by the light guide of the first light function. Since the emitted laser light has a different wavelength than the light from other light sources, for example, LED light sources, the lighting functions can be differentiated already due to the different light color.

According to a preferred embodiment, an anti-glare frame is provided which surrounds the reflector, wherein it is ensured by means of a recess that only the light incident on the reflector is deflected and radiated into the surroundings. This increases the security by avoiding a direct look at the laser light source. The anti-glare frame can also serve as a housing recess of the light unit so formed to form the second light function.

According to a further development of the invention, the recess of the anti-glare frame comprises a formation on one longitudinal side facing the laser light source so that a comprehensive screening of the laser light source to the surroundings is provided except for an illuminated area directed onto the reflector, which serves to release only the light of the laser light source so that it can then be radiated by deflection into the surroundings.

According to a further development of the invention, the reflector is made elongated, whereby it has a width of less than 6 mm. The laser light source together with the reflector can be advantageously used to produce a rear fog light function as a second light function.

According to a further development of the invention, the laser light source is designed as a single laser diode that can be conveniently mounted on a holder body. The laser diode allows in conjunction with the reflector the production of the second light function in a space-saving manner. Since the laser light source radiates light with a dark red light color (wavelength range 635 nm-650 nm), the light unit thus formed is preferably suitable for generating a rear fog light function. In particular, this can create a distinction from the comparatively light red (617 nm) of the LED light source that serves to generate a stoplight function in a taillight. The laser diode allows better visibility for the second light function and thus a higher level of traffic safety. In particular, the reduction of the illuminating surface can achieve better recognition of this light function due to increased luminance.

According to a further development of the invention, the laser light source and the reflector are attached to a common support body. The laser light source and the reflector can thus be adjusted in the pre-assembly stage and only then mounted, together with the other components, in the common housing of the lighting device. A readjustment of the laser light source is then no longer necessary.

According to a further development of the lighting device, by forming a light conducting device as an optical disc with an integrated lens, the area illuminated by a laser light source (illuminated area) to produce a light-emitting function can be reduced. The dimension of the light to produce a light function, e.g. a rear fog light function, can thus be further reduced. The laser light source radiates light in the main radiation direction, wherein the optical disc is arranged in the main radiation direction in front of it. Moreover, the division in the housing of the lighting device can be made variable for different lighting functions. Since between the rear fog light and the stop light must always exist a statutory minimum distance, the spatial positioning of the lighting functions can be made more variable.

The invention can be positioned in a space-saving manner on add-on components of a vehicle body, for example a bumper, due to its small dimensions.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

An inventive lighting device can be used in vehicles, preferably in motor vehicles in the front area and/or in the rear area.

Figure 1:
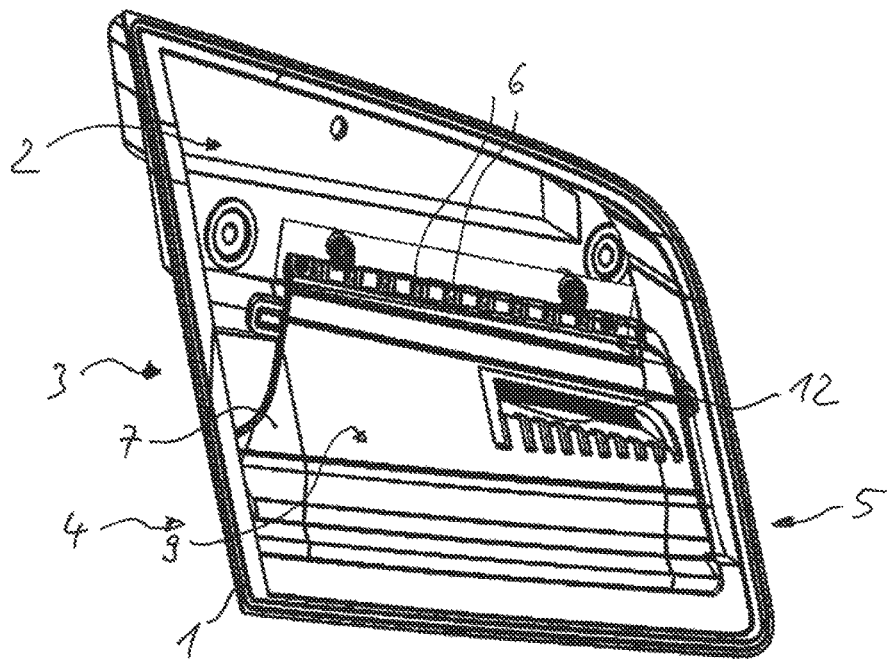
FIG. 1 shows a front view of a lighting device having a plurality of light emitting units, wherein a rear fog light is located behind a light guide of a taillight.
Figure 2:
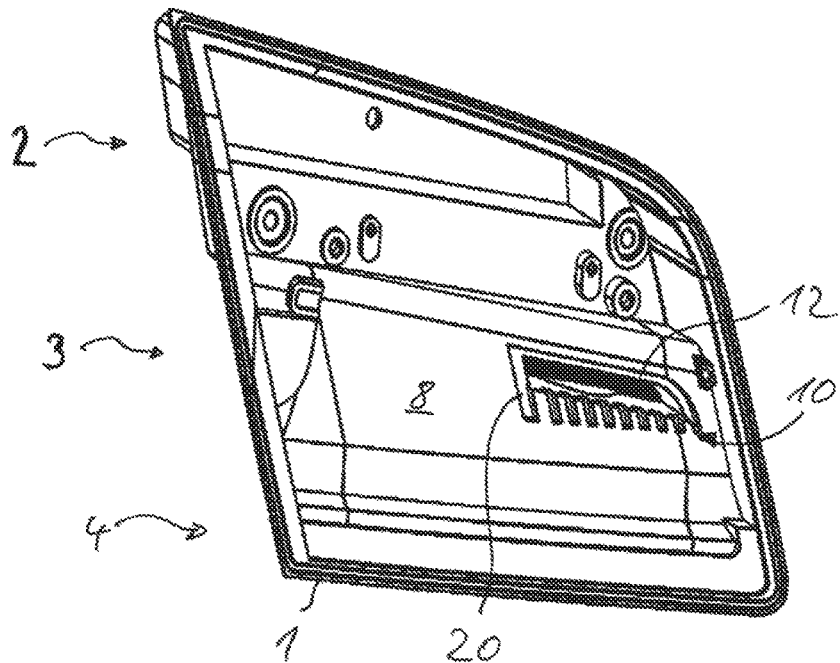
FIG. 2 shows a front view of the lighting device according to FIG. 1 omitting the light guide and LED light sources associated with it.

FIGS. 1 and 2 show a rear lighting device with a housing 1, in which in an upper area 2 is integrated a blinker light or reverse light. In a central area 3 adjoining the upper area 2 and in a lower area 4 is arranged a taillight 5, which comprises a plurality of LED light sources 6 arranged on a common printed circuit board and a planar light guide 7. The strip-shaped arrangement of LED light sources 6 is arranged in the central area 3 of the housing 1 and connects to the light on a narrow side of the light guide 7. On a side facing the bottom 8 of the housing 1, the light guide 7 has disconnecting elements so that the light for the generation of the tail lamp function as a first light function emerges from the flat side 9 of the light guide 7, which faces away from the floor bottom 8 of the housing 1, and exits in the main radiation direction H of the lighting device.

A rear fog light 10 is covered by the red-colored light guide 7 of the taillight 5 (first light-emitting unit) and in the non-operating state of the fog taillight 10 (second light-emitting unit) is not recognizable.

Figure 4:
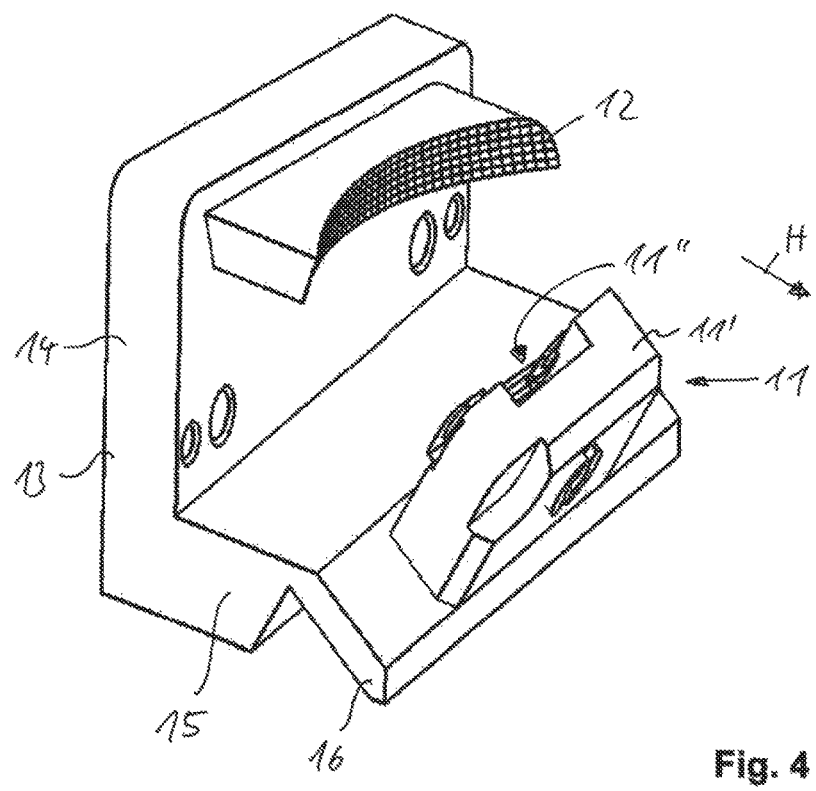
FIG. 4 shows a perspective view of a holder body of the rear fog light, in which the reflector and light source are mounted.
Figure 5:
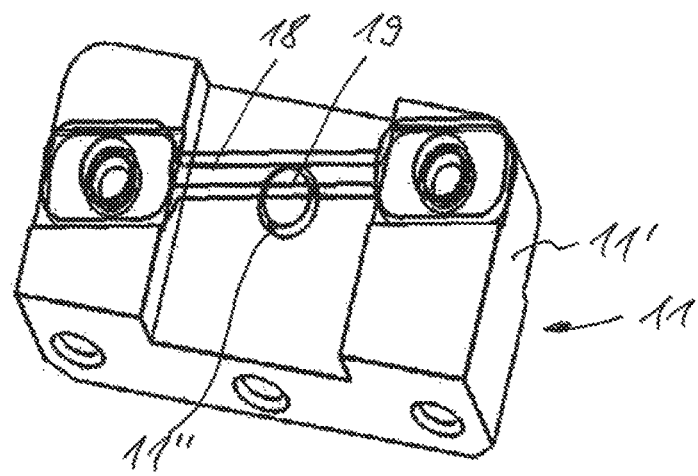
FIG. 5 shows a front view of the laser light source with an optional upstream lens.
Figure 6:
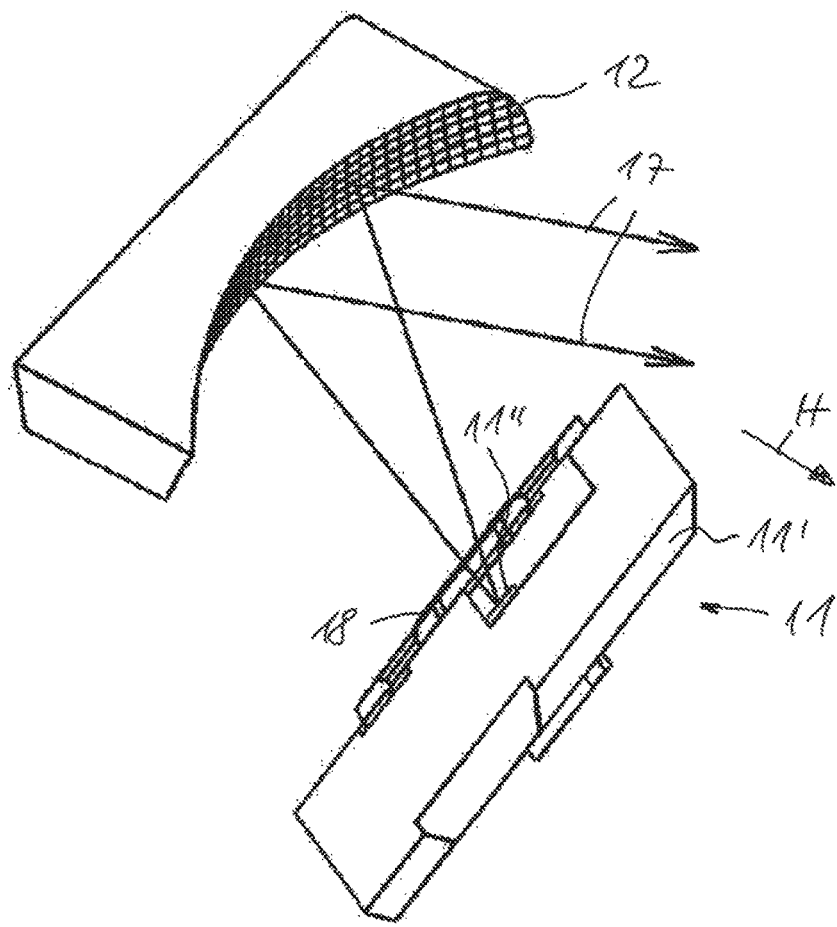
FIG. 6 shows a perspective view of the laser light source and the reflector with marked light beams.

The rear fog light 10 substantially comprises a laser light source 11 and a reflector 12 as a light conducting device, which according to a first variant of the invention are mounted on a common support body 13 (see FIG. 4). The support body 13 is formed angularly, wherein it preferably comprises an upright first leg 14 and a horizontally extending second leg 15. On the first leg 14 is internally fixed the reflector 12. The second leg 15 has a snap-off end 16 to which is fixed the laser light source 11. An optical axis of the laser light source 11 extends parallel to the snap-off end 16, wherein the snap-off end 16 and the optical axis of the laser light source 11 are arranged at an acute angle to the first leg 14.

The laser light source 11 comprises a cuboid-shaped lamp body 11', in which a single laser diode 11" is arranged as a light source. The laser light source 11 or the laser diode 11" is arranged on the snap-off end 16 so that light beams 17 of the laser light source 11 impacting on the reflector surfaces of the reflector 12 are deflected by it in the main radiation direction H so that the light beams 17 then pass the light guide 7 and emerge into the surrounding area from the reflector's opposite flat sides 9. The laser light source 11 is arranged in a vertical plane between the reflector 12 and the light guide 7 of the taillight 5. The light beams 17 radiated by the laser light source 11 impact the reflector 12 at a relatively steep angle so that they are reflected at a relatively steep angle toward the light guide 7. The light beams 17 of the laser light source 11 are in the present embodiment obliquely radiated downwards and counter to the main radiation direction H of the lighting device in the direction of the reflector 12.

In order to enhance the focusing of the light beams 17 on the reflector 12, the laser light source 11 may be preferably provided with an optical disk 18 having a lens 19. The optical disk 18 with the lens 19 is thus arranged between the laser diode 11' and the reflector 12.

Figure 3:
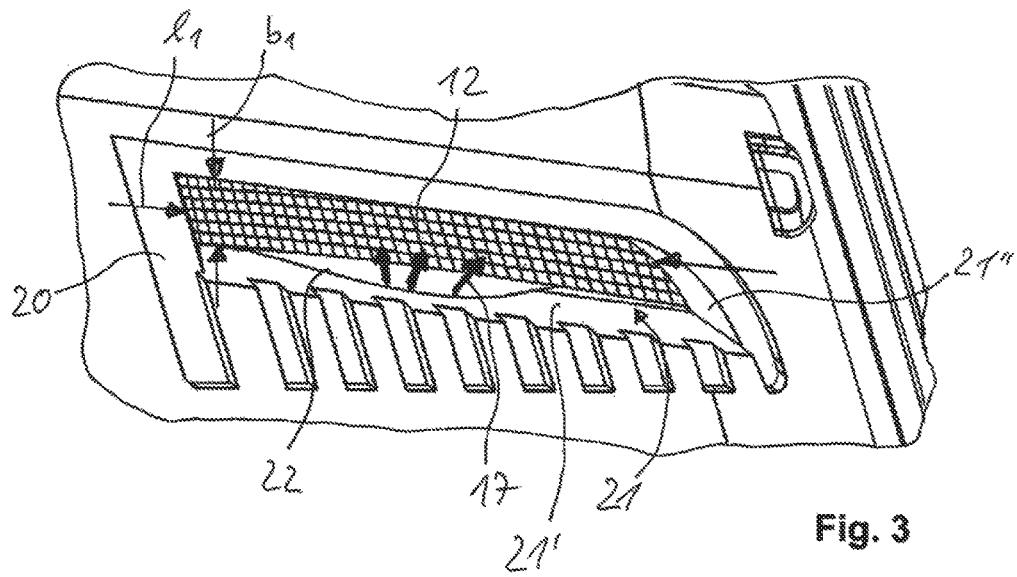
FIG. 3 shows an enlarged front view of the rear fog light with an anti-glare frame and a reflector.

As can be seen in FIG. 3, between the light guide 7 and the reflector 12 is arranged an anti-glare frame 20 with a recess 21 which prevents an undesirable escape of light beams 17 of the laser diode 11' in an uncontrolled manner. For this purpose, the recess 21 has long narrow sides 21' and short narrow sides 21', which extend substantially parallel to the main radiation direction H or slightly inclined to it. For the light beams 17 of the laser light source 11 to specifically reach the reflector 12, the recess 21 has at a long narrow side 21' a formation 22 so that the light beams 17 coming obliquely from below can impact the reflector 12.

The reflector 12 is formed elongated and has a width $b_1$, which is less than 6 mm. The reflector 12 may have a length $I_1$ in a range between 30 mm and 50 mm. The dimension of the reflector 12 specifies the illuminated area (light emitting surface) of the rear fog light. Since the laser diode 11″ emits light in a wavelength range between 635 nm to 650 nm, light is emitted at a comparatively dark red color. In the operating state of the rear fog light 10, an area of the light guide 7 corresponding to the dimensions of the reflector 12 is illuminated, which area appears darker compared to the operating state of the taillight 5. In this way, a relatively small-sized rear fog light function is realized with high intensity, where the rear fog light 10 is arranged in a space-saving manner behind the light guide 7 of the taillight 5.

Compared to a rear fog light with an LED light source as a light source, this results in a multiple luminance increase.

Figure 7:
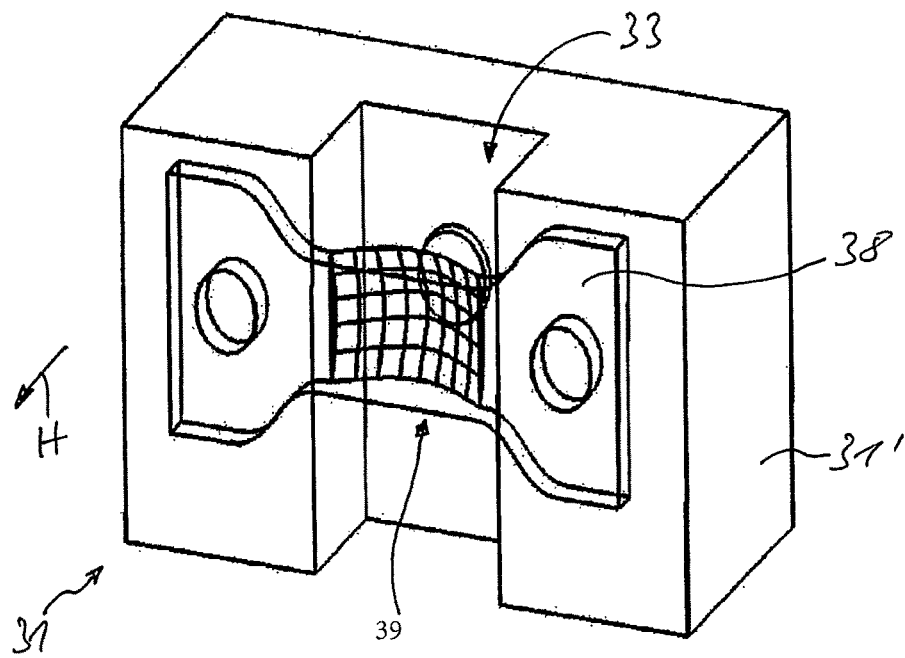
FIG. 7 shows a perspective front view of a rear fog light according to a second embodiment.
Figure 8:
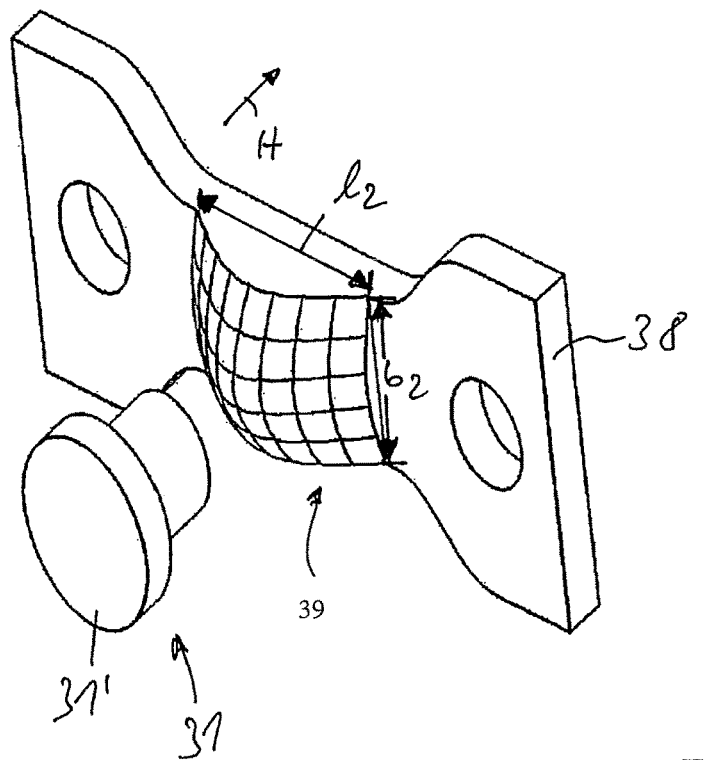
FIG. 8 shows a perspective rear view of the rear fog light as shown in FIG. 7.
Figure 9:
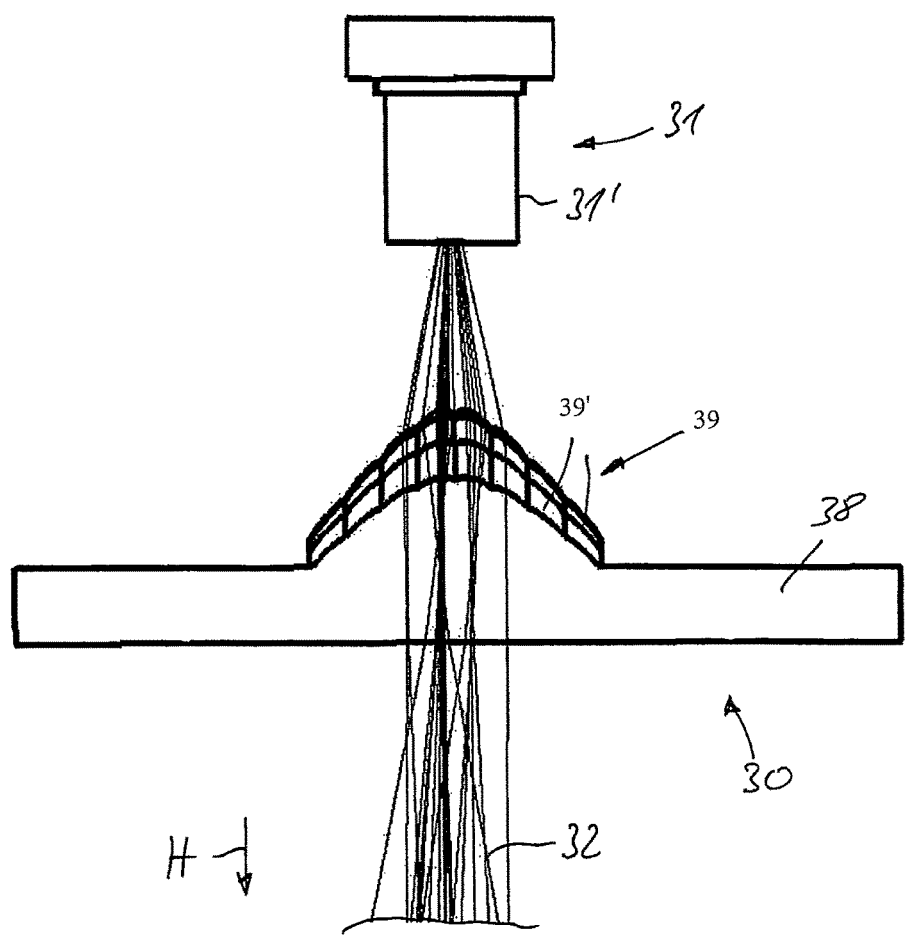
FIG. 9 shows schematic plan view of the rear fog light as shown in FIGS. 7 and 8 with marked light beams.

According to a second embodiment of the invention shown in FIGS. 7 through 9, a laser light source 31 may be provided, which is positioned so that light beams 32 are radiated in the main radiation direction H. As a light conducting device, the laser light source 31 is assigned merely an optical disk 38 with a lens 39, which by means of its scattering effect produces the rear fog light distribution. The lens 39 has a plurality of facets 39′ and is arranged curved in the direction of the laser light source 31. The lens 39 is arranged in such a distance to a laser diode 31″ of the laser light source 31 that the desired rear fog light distribution is produced.

The laser light source 31 has a lamp body 31′, which—like the support body 13 according to the first embodiment—can be designed as a heat sink for heat dissipation of the laser diode 31′.

As can be seen in FIG. 7, the optical disc 38 is attached by fastening means to a front side of the lamp body 31′. The lens 39 is formed plano-convex, wherein the bulbous section is arranged on a side facing the laser diode 31′. The lens 39 thus extends in a groove 33 of the otherwise cuboid lamp body 31′. The thus formed rear fog light 30 has thus a compact and relatively small structure. The optical surface of the lens 39 has only a width $b_2$ of 5 mm and a length $I_2$ of 8 mm.

According to an alternative embodiment not shown, a lens 39 can be arranged at opposite sides of the optical disc 38 or on only one side facing away from the laser diode 31′.

It is understood that the described laser light source and the light conducting devices (reflector 12, optical disc 18, 38, lens 19, 39) can also be used for other lighting functions.

For example, the rear fog light 10 and 30 can be integrated in an add-on component of a vehicle body, e.g. in a bumper.

List of reference numerls

| | |
|---|---|
| 1 | Housing |
| 2 | Upper area |
| 3 | Middle area |
| 4 | Lower area |
| 5 | Taillight |
| 6 | LED light sources |
| 7 | Light guides |
| 8 | Bottom |
| g | Flat side |
| 10 | Rear fog light |
| 11, 11′ 11″ | Laser diode |
| 12 | Reflector |
| 13 | Support body |
| 14 | First leg |
| 15 | Second leg |
| 16 | Snap-off end |
| 17 | Light beams |
| 18 | Optical disk |
| 19 | Lens |
| 20 | Anti-glare frame |
| 21 | Narrow side |
| 21′ | Long narrow side |
| 21″ | Short narrow side |
| 22 | Formation |
| 31 | Laser light source |
| 31′, 31″ | Laser diode |
| 33 | Groove |
| 38 | Optical disk |
| 39 | Lens |
| 39′ | Facets |
| H | Main radiation direction |
| b, $b_1$, $b_2$ | Width |
| I, $I_1$, $I_2$ | Length |

The invention claimed is:

1. A lighting device for vehicles, comprising:
a laser light source;
an upstream light conducting device for generating a predetermined lighting function, said light conducting device including
a reflector positioned at an angle to the laser light source for deflecting light from the laser light source towards a main radiation direction, a focusing lens for focusing the light of the laser light source in the direction of the reflector, and a light guide for conducting light to generate a further light function, wherein the laser light source and the reflector are arranged in the main radiation direction behind the light guide, such that the light emitted by said laser light source passes through the light guide; and wherein the reflector is formed elongated and narrow, wherein it has a width of less than 6 mm.

2. A lighting device for vehicles, comprising:
a laser light source;
an upstream light conducting device for generating a predetermined lighting function, said light conducting device including
a reflector positioned at an angle to the laser light source for deflecting light from the laser light source towards a main radiation direction, a focusing lens for focusing the light of the laser light source in the direction of the reflector, and a light guide for conducting light to generate a further light function, wherein the laser light source and the reflector are arranged in the main radiation direction behind the light guide, such that the light emitted by said laser light source passes through the light guide; and wherein the reflector has a length of 30 mm to 50 mm.

3. A lighting device for vehicles, comprising:
a laser light source;
an upstream light conducting device for generating a predetermined lighting function, said light conducting device including
a reflector positioned at an angle to the laser light source for deflecting light from the laser light source towards a main radiation direction, a focusing lens for focusing the light of the laser light source in the direction of the reflector, and a light guide for conducting light to generate a further light function, wherein the laser light source and the reflector are arranged in the main radiation direction behind the light guide, such that the light emitted by said laser light source passes through the light guide; and wherein the laser light source and the reflector are mounted on a common support body, which is mountable on a housing of the lighting device.

4. The lighting device according to claim 3, wherein the support body includes at least a first and a second leg arranged at an angle to one another, wherein the reflector is attached to the first leg and the laser light source to the second leg.

5. The lighting device according to claim 4, wherein the second leg of the support body comprises a snap-off end to which is fixed the laser light source.

6. A lighting device for vehicles, comprising:
a laser light source;
an upstream light conducting device for generating a predetermined lighting function, said light conducting device including:
a reflector positioned at an angle to the laser light source for deflecting light from the laser light source towards a main radiation direction, a focusing lens for focusing the light of the laser light source in the direction of the reflector, and a light guide for conducting light to generate a further light function, wherein the laser light source and the reflector are arranged in the main radiation direction behind the light guide, such that the light emitted by said laser light source passes through the light guide; and
wherein between the light conductor and the reflector is provided an anti-glare frame surrounding the reflector with a recess, through which the light reflected by the reflector is released in the direction of the light guide.

7. The lighting device according to claim 6, wherein the recess of the anti-glare frames comprises narrow sides pointing to the reflector at an angle, wherein a long narrow side has a formation for the passage of light emitted by the laser light source toward the reflector.

8. The lighting device according to claim 6 wherein the laser light source is formed as a single laser diode.

9. The lighting device according to claim 6, including the primary lens, wherein the primary lens is arranged integrated in an optical disc of the light conducting device, wherein the primary lens is designed such that the light is scattered for generating a fog light function or that the light is focused onto the reflector.

10. The lighting device according to claim 9, including the primary lens, wherein the primary lens is arranged on at least one of a first flat side and on a second flat side of the optical disc.

11. The lighting device according to claim 9 wherein the light conducting device comprises only the optical disc which is arranged in the main radiation direction (H) of the lighting device in front of the laser light source.

* * * * *